United States Patent [19]

Vohl

[11] Patent Number: 4,637,503

[45] Date of Patent: Jan. 20, 1987

[54] CONTROL DEVICE FOR CLUTCH

[76] Inventor: Paul-Eugène Vohl, 1738 Principale Street, Saint-Marc des Carrières, Canada, G0A 4B0

[21] Appl. No.: 729,927

[22] Filed: May 3, 1985

[51] Int. Cl.$^4$ ............................................. F16D 23/12
[52] U.S. Cl. .................................... 192/83; 192/99 S; 192/101; 192/85 C
[58] Field of Search ...................... 192/70.3, 83, 85 C, 192/99 A, 99 S, 101, 111 R, 111 A

[56] References Cited

U.S. PATENT DOCUMENTS

| | | | |
|---|---|---|---|
| 2,104,580 | 1/1938 | Brewer | 192/83 X |
| 3,195,417 | 7/1965 | Hager et al. | 192/83 X |
| 3,438,473 | 4/1969 | Rohrbacher | 192/83 X |
| 3,656,595 | 4/1972 | Gethmann et al. | 192/83 X |
| 4,189,043 | 2/1980 | Steinhagen | 192/111 A |
| 4,263,999 | 4/1981 | Fasano | 192/111 A |

FOREIGN PATENT DOCUMENTS 706724  3/1965  Canada .

Primary Examiner—Rodney H. Bonck
Assistant Examiner—Alan G. Towner

[57] ABSTRACT

A control device to remotely engage and disengage a clutch having a manually-operable lever, consisting of a link pivoted to the lever and to a sector plate. The latter is pivotally mounted on a base and is adapted for movement with a swing arm mounted on the same pivot and extending radially of the sector plate. The swing arm carries a slidable dog releasably engaged with the sector plate and is moved by a power-operated lifter. The sector plate is connected to the link and is adapted to move between a first declutched position, and a second clutched position, and a final operative position intermediate the two first-named positions, nearer the second position, thereby preventing undue stress on the bearings of the clutch actuation assembly when the clutch is operative.

6 Claims, 4 Drawing Figures

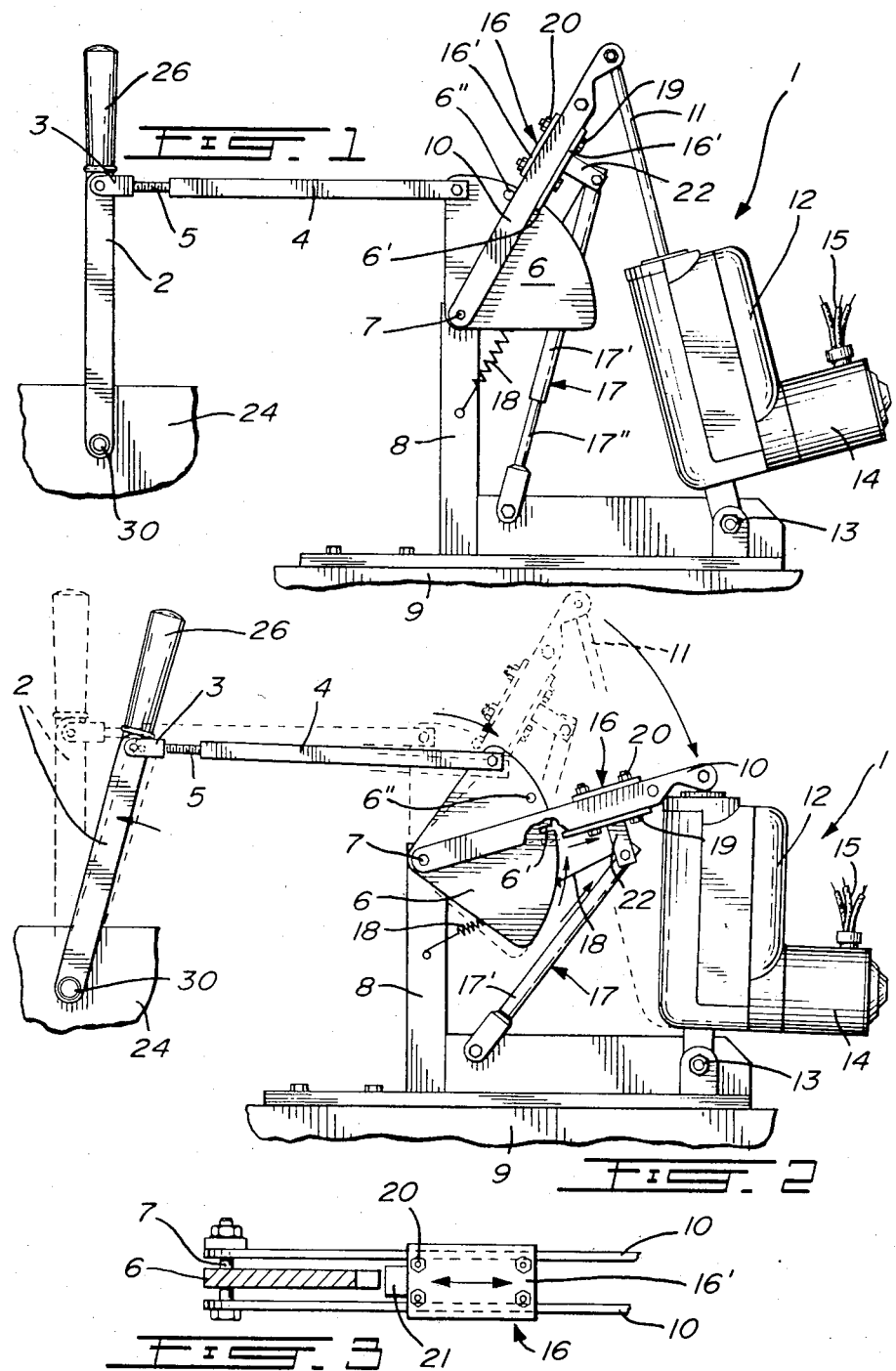

CONTROL DEVICE FOR CLUTCH

FIELD OF THE INVENTION

The present invention relates generally to clutch control devices, more specifically to a device adapted to automatically engage and disengage the clutch of a snowblower implement.

BACKGROUND OF THE INVENTION

Snowblowers are normally provided with a clutch to engage and disengage the output shaft relative to the motor which powers the helical blades and blowing fan. The snowblower may be of a single unit attached to the front of a carrier vehicle, or may be a modular implement to minimize downtime of the snowblower, as in applicant's previous U.S. Pat. No. 4,477,988 dated Oct. 23, 1984. In either case, the clutch must be actuated by a lever, manually, which is located at the snowblower itself, remote from the carrier vehicle. The operator of the snowblower must therefore leave the cab of the carrier vehicle each time he/she wants to operate the clutch.

Another problem is that the fork of the clutch lever is linked to the clutch assembly by a toggle; this requires a partial return of the clutch lever from its limit clutching position, in order to release the axial thrust on the bearings involved and, thus, prevent rapid burning out of said bearings.

OBJECTS OF THE INVENTION

In view of the above, it is a first object of the present invention to provide an automatic control device for a snowblower clutch which is controlled from the cab of the carrier vehicle.

It is another object of the present invention to provide a control device of the above type which eliminates any danger of clutch bearing burnout.

SUMMARY OF THE INVENTION

The above and other objects and advantages of the invention are realized according to a preferred embodiment comprising and adapted for use with a conventional over center, friction type clutch assembly enclosed in a housing and operatively connected to a motor and a central longitudinal output shaft.

A projecting control lever is connected to the thrust bearing of the clutch and extends outwardly of the housing. Preferably, the lever is arranged upwardly, vertically.

The outer end of the lever has pivotally secured thereto a link member having an opposite end, in turn pivotally secured to a shift mechanism. The latter includes a sector plate pivotally mounted at its corner to a support a swing arm pivotally secured to the same pivot, at one end, as the sector plate corner and projecting radially outwardly relative thereto. The opposite end of the swing arm is pivotally attached to a power-operated lift means, such as, preferably, the piston rod of a hydraulic cylinder which is preferably powered by a pump and electric motor electrically connected to a remote control switch.

The above-mentioned opposite end of the link member is pivotally attached to the rear side of the sector plate adjacent the arc portion thereof.

The swing arm is provided with sector plate-engaging means which function cooperatively with a release means for the same, as described below.

In the declutched position, the control lever is generally vertical and the piston rod of the hydraulic cylinder is in a fully-extended first limit position. When the piston rod is retracted, the swing arm swings the sector plate, and thus the link arm, towards a second limit position to engage the clutch of the snowblower. At this second limit position, the sector plate-engaging means of the swing arm automatically releases the sector plate. This is accomplished by a release means. The sector plate is then free to move slightly towards the first limit position and to a third operative position, wherein the axial thrust exerted on the thrusting bearing of the clutch is eliminated.

As will be clear from the description below, the device of the invention does not prevent the control lever from being operated manually, should the need arise.

BRIEF DESCRIPTION OF THE DRAWINGS

The above will be more clearly understood by having referral to the preferred embodiment of the invention, illustrated by way of the accompanying drawings, in which:

FIG. 1 is a side elevation of the device according to the invention in the first limit or declutched position;

FIG. 2 is another side elevation of the device but in the second limit or clutched position, in dashed outline with the arrows indicating direction of movement of the different elements;, and in a third operative position shown in full lines FIG. 3 is a top plan view of the swing arm, also showing the sector plate in cross-section.

Like numerals indicate like elements throughout the drawings.

DETAILED DESCRIPTION OF THE PREFERRED EMBODIMENT

Figure 4:
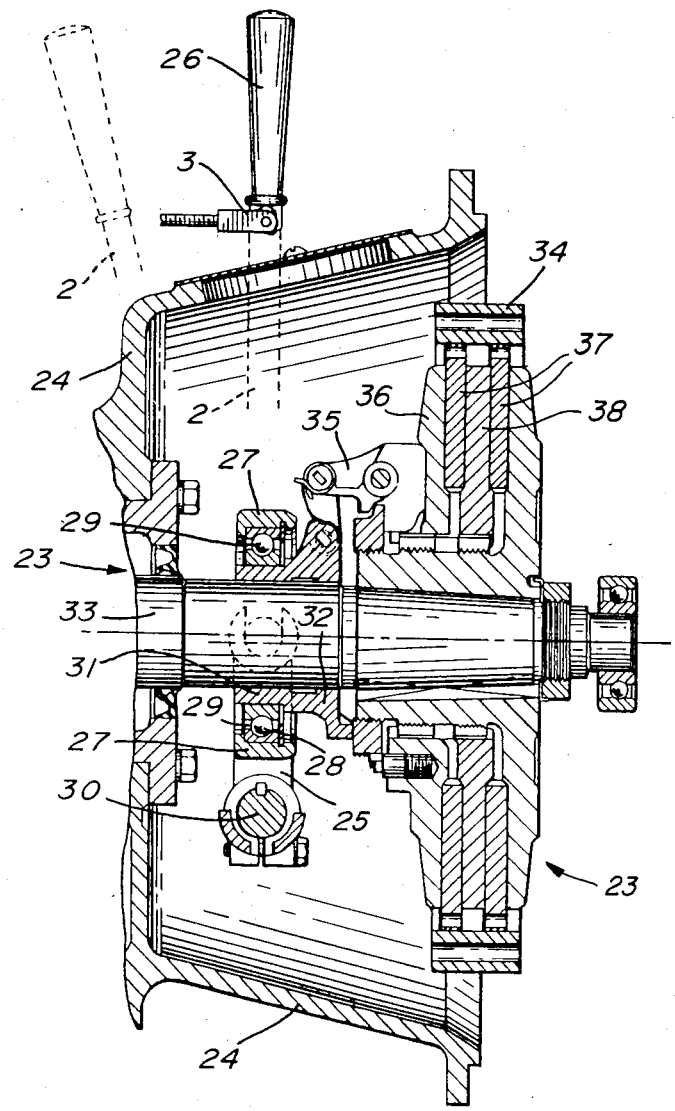
FIG. 4 is a vertically-sectioned elevation of a conventional clutch as used in a snowblower.

Referring firstly to FIGS. 1 to 3, there is shown the clutch shifting mechanism 1 of the invention.

FIGS. 1 and 2 represent the control lever for the clutch assembly shown in FIG. 4 and described below. Lever 2 is fixed at its lower end to a transverse shaft 30 journalled in the housing 24 of a conventional clutch 23.

The upper end of lever 2 is pivotally connected to a clevis joint 3, which in turn is secured to a link member 4. The length of the latter is made adjustable by a turnbuckle arrangement 5 to compensate for clutch wear.

Link member 4 is further pivotally attached at its opposite end to a vertically-disposed sector plate 6 at the upper side area thereof. Sector plate 6 has a middle notch 6' formed in its arc and is itself pivoted at its lower corner 7 to an upstanding support leg 8, the latter being fixed to a suitable base 9. Also pivoted at 7 is a double-arm swing member 10 extending on both sides of the plate 6. The other end of swing member 10 is pivoted to the end portion of the piston rod 11 of a conventional electrically-operated lifter unit 12. Unit 12 is uprightly pivoted to the base 9 at 13, extending upwardly therefrom. Unit 12 includes a reversible electric motor 14, which drives a hydraulic pump which feeds hydraulic fluid to either end of a cylinder for piston rod 11 with the provision of suitable check valves. All these elements are incorporated in unit 12, which is sold inter alia by Prestolite Batteries Battronics Inc., of Drummondville, Quebec, Canada. Motor 14 has three wires 15 electrically connected into a circuit through three contact electrical switches for selectively driving motor 14 in either direction. One switch is located in the cab of the carrier vehicle and the other on a control panel near clutch lever 2.

Means to releasably engage swing member 10 to sector plate 6 are provided, consisting of: a slidable dog 16, a telescopically-extensible arm 17 and a tension spring 18. Dog 16 is formed of a pair of upper and lower plates 16', slidably secured to and guided on the edges of swing member 10 by bolts 19 and nuts 20. The lower plate of plates 16' is formed with a projection 21 and a downwardly-extending lug 22. Extensible arm 17 is formed with a tube 17' and a rod 17" made slidable in the former. Tube 17' is pivotally secured to lug 22, while rod 17" is pivoted by a clevis to base 9 adjacent leg 8. Tension spring 18 extends between swing member 10 and arm 17, being attached to lug 22 and leg 8 below plate 6.

FIG. 4 illustrates a conventional over center, friction type clutch 23 enclosed in a housing 24. Control lever 2 has an upper handle 26 and rotates shaft 30, which in turn moves, through arm 25, a ring 27 which encircles and retains the outer race 28 of a thrust bearing 29. The inner race 31 of bearing 29 pushes against a slider sleeve 32 slidably surrounding output shaft 33 and rotating therewith. Slider sleeve 33 produces clutching of output shaft 33 to input ring 34 through over center levers 35 which force floating plate 36 to clampingly engage friction type clutch plates 37, 38;.

The other elements of clutch 23 need not be further described, since the clutch is conventional.

Lever 2 must be moved to the right in the figures to a limit position to cause over center levers 35 to engage the clutch; in this limit position, a substantial axial thrust is exerted on thrust bearing 29 and this thrust must be removed by allowing lever 2 to return to an intermediate position.

The invention is simple and operates in the following manner. Referring to FIG. 1, there is shown a first limit position at which lever 2 is generally vertical; piston rod 11 is fully extended and projection 21 of dog 16 is engaged in notch 6' of plate 6, dog 16 being continually biased toward plate 6 by spring 18. Extensible arm 17 is fully extended. The clutch is disengaged.

In FIG. 2, piston rod 11 is retracted by actuator unit 12, thereby moving sector plate 6 and link member 4 to the right, so that clutch lever 2 moves also to the right to a limit clutching position. As the assembly approaches this second limit position (shown in dashed outline for lever 2 and link 4 in FIG. 2), dog 16 is pushed away from plate 6 by arm 17, since the latter cannot be further telescoped. Outer tube 17' is of predetermined length for this purpose. Thus, dog projection 21 is freed from slot 6' of plate 6, allowing plate 6 to pivot freely slightly to the left under return action of clutch lever 2, and to a third operative position (shown in solid line in FIG. 2). Thus, the axial thrust exerted on bearings 29 is cancelled. Such feature is an essential part of the invention, because the bearings 29 would burn out very rapidly otherwise.

It is to be noted that lever 2 may be operated manually by handle 26 without having to disconnect the device of the invention.

As a safety precaution, sector plate 6 is prevented from pivoting or falling to the right in the event projection 21 becomes disengaged from slot 6'. This is accomplished by a stop means consisting of a laterally-projecting pin 6" fixed to the arc portion of the plate and abutting the top edge of swing arm 10.

What I claim is:

1. A control device for an over center, friction type clutch comprising a main shaft, friction type clutch plates, a floating plate for clampingly engaging said clutch plates, a sleeve axially slidable on said shaft, over center levers interconnecting said sleeve and floating plate, a thrust bearing having an inner race fixed to said sleeve, a manually-operable control lever acting on the outer race of said thrust bearing and pivotable between a first position in which said clutch plates are disengaged, and a second position in which said clutch plates are engaged through axial thrust exerted on said thrust bearing, said control lever, when released, returning to a third position intermediate said first and second positions and close to said second position to eliminate said axial thrust on said thrust bearing, said control device comprising a fixed support, a swing arm and a pivotal plate both pivoted to said support, a link member pivotally interconnecting said control lever and said pivotal plate, a power-operated means connected to said swing arm to pivot the same about said support, a pivotal plate-engaging means movably mounted on said swing arm and biased into engagement with said pivotal plate to fixedly interconnect said swing arm and said pivotal plate, a release means to release said pivotal plate-engaging means from said pivotal plate, said power-operated means actuable to pivot said swing arm, the latter in turn pivoting said pivotal plate through said pivotal plate-engaging means between a first limit and a second limit position causing said control lever to take its first position and its second position, respectively, said release means releasing said pivotal plate-engaging means from engagement with said pivotal plate when said pivotal plate reaches its second limit position to allow said pivotal plate to pivot back towards its first limit position, thereby releasing said control lever to return to its third position.

2. A control device as defined in claim 1, wherein said pivotal plate is sector shaped and is pivotally connected to said support by a transverse pivot co-axial with the arc portion of the sector-shaped pivotal plate, said swing arm pivoted at one end by the same transverse pivot to said support and projecting radially of said sector-shaped pivotal plate beyond the arc portion of the same, said pivotal plate-engaging means including a dog slidably mounted on the portion of said swing arm projecting radially outwardly from said pivotal plate, a projection formed on said dog and facing said arc portion; biasing means to urge said dog towards said pivotal plate, a notch formed in said arc portion of said pivotal plate, said notch being engageable by said projection, whereby said swing arm pivots said pivotal plate between said first and said second limit position when said power-operated means are actuated.

3. The control device as defined in claim 2, wherein said power-operated means includes a hydraulic cylinder having a piston rod, a pump to actuate said cylinder and a reversible electric motor to power said pump, said motor being adapted to be electrically connected to a remote control switch; said outer end of said swing arm being pivotally secured to the end of said piston rod; said cylinder being pivotally secured to said support.

4. The control device as defined in claim 2, wherein said release means includes a telescopically-extensible member pivotally secured at one end to said support beneath said sector plate, a lug depending from said dog, the other end of said extensible member being pivotally secured to said lug; said extensible member having a predetermined shortest length, whereby, when fully telescoped, said extensible member pushes said dog away from said sector plate as the latter approaches said second limit position.

5. The control device of claim 4, wherein said sector plate is provided with a stop in the path of said swing arm adapted to abut said swing arm to prevent pivotal movement of the sector plate towards said second limit position upon accidental disengagement of said dog projection from said notch of the sector plate when said swing arm pivots said sector plate towards its first limit position.

6. The control device of claim 1, wherein said link member is provided with length-adjustment means to compensate for clutch wear.

* * * * *